United States Patent
Kawai et al.

(10) Patent No.: US 9,651,302 B2
(45) Date of Patent: May 16, 2017

(54) PURIFICATION METHOD AND PURIFICATION APPARATUS FOR FEED AIR IN CRYOGENIC AIR SEPARATION

(75) Inventors: Masato Kawai, Yokohama (JP); Morimitsu Nakamura, Kai (JP)

(73) Assignee: TAIYO NIPPON SANSO CORPORATION, Tokyo (JP)

( * ) Notice: Subject to any disclaimer, the term of this patent is extended or adjusted under 35 U.S.C. 154(b) by 1915 days.

(21) Appl. No.: 12/096,894

(22) PCT Filed: Dec. 12, 2006

(86) PCT No.: PCT/JP2006/324763
§ 371 (c)(1),
(2), (4) Date: Jun. 10, 2008

(87) PCT Pub. No.: WO2007/069605
PCT Pub. Date: Jun. 21, 2007

(65) Prior Publication Data
US 2009/0282866 A1    Nov. 19, 2009

(30) Foreign Application Priority Data

Dec. 14, 2005 (JP) ............................ P2005-361073
Mar. 28, 2006 (JP) ............................ P2006-087564

(51) Int. Cl.
  *F25J 3/00*  (2006.01)
  *F25J 3/04*  (2006.01)
  *B01D 53/04* (2006.01)

(52) U.S. Cl.
  CPC ...... *F25J 3/04169* (2013.01); *B01D 53/0462* (2013.01); *B01D 2257/504* (2013.01);
  (Continued)

(58) Field of Classification Search
  CPC .............. F25J 3/04169; F25J 2290/12; B01D 53/0462; B01D 2257/504; B01D 2257/80;
  (Continued)

(56) References Cited

U.S. PATENT DOCUMENTS 4,529,416 A * 7/1985 Sircar et al. .................... 95/116
4,964,888 A   10/1990 Miller
(Continued)

FOREIGN PATENT DOCUMENTS

EP    0 862 938        9/1998
EP    0 992 274 A1     4/2000
(Continued)

OTHER PUBLICATIONS

Extended European Search Report in EP 06 83 4518 dated Jan. 28, 2010.
(Continued)

*Primary Examiner* — Frantz Jules
*Assistant Examiner* — Webeshet Mengesha
(74) *Attorney, Agent, or Firm* — Nixon & Vanderhye P.C.

(57) ABSTRACT

A purification method for feed air in cryogenic air separation of the present invention includes purifying the feed air for the cryogenic air separation by using a temperature swing adsorption method, wherein the whole region of a carbon dioxide adsorbent layer packed in an adsorption column is used as a mass transfer zone of a carbon dioxide. Also, a purification apparatus for feed air in cryogenic air separation of the present invention includes at least two adsorption columns; and a moisture adsorbent and a carbon dioxide adsorbent being laminated and packed in the adsorption columns, wherein the packed amount of the carbon dioxide adsorbent is the same as the amount of the carbon dioxide adsorbent in the region of the carbon dioxide adsorbent which a mass transfer zone of a carbon dioxide occupies at (Continued)

the end of an adsorption step, and a temperature swing adsorption method is used.

11 Claims, 4 Drawing Sheets (52) U.S. Cl.
CPC .... *B01D 2257/80* (2013.01); *B01D 2259/402* (2013.01); *B01D 2259/416* (2013.01); *B01D 2259/4508* (2013.01); *F25J 2290/12* (2013.01); *Y02C 10/08* (2013.01)

(58) Field of Classification Search
CPC ...... B01D 2259/402; B01D 2259/4508; B01D 2259/416
USPC ............... 62/640, 641, 644; 95/129, 139
See application file for complete search history.

(56) References Cited

U.S. PATENT DOCUMENTS

| 5,689,974 | A | * | 11/1997 | Fujita et al. | 62/644 |
| 5,914,455 | A | * | 6/1999 | Jain et al. | 95/96 |
| 6,093,379 | A | * | 7/2000 | Golden et al. | 423/230 |
| 6,106,593 | A | * | 8/2000 | Golden et al. | 95/120 |
| 6,273,939 | B1 | * | 8/2001 | Millet et al. | 95/106 |
| 6,391,092 | B1 | * | 5/2002 | Shen et al. | 95/120 |
| 6,506,236 | B2 | * | 1/2003 | Golden et al. | 95/129 |
| 6,537,348 | B1 | | 3/2003 | Hirano et al. | |
| 2004/0118279 | A1 | | 6/2004 | Kalbassi et al. | |

FOREIGN PATENT DOCUMENTS

| EP | 1 092 465 A2 | 4/2001 |
| JP | 5-337319 | 12/1993 |
| JP | 2000-107546 | 4/2000 |
| JP | 2001-347123 | 12/2001 |
| JP | 2004-154761 | 6/2004 |
| TW | 293782 | 12/1996 |
| TW | 355734 | 4/1999 |
| TW | 358173 | 5/1999 |
| TW | 542896 | 7/2003 |
| WO | WO 03/053546 A1 | 7/2003 |
| WO | 2006/137306 | 12/2006 |

OTHER PUBLICATIONS

Oct. 27, 2010 Official Action (with English translation) in Chinese patent application 200680046775.6.
Notice of Decision to Grant Patent (and English translation) in Korean Application 10-2008-7014039 mailed May 25, 2011.
"Latest Adsorption Technique Handbook", published in 1999, translation of p. 130, right column, lines 7-12.
International Search Report for PCT/JP2006/324763, mailed Jan. 30, 2007.

* cited by examiner

PURIFICATION METHOD AND PURIFICATION APPARATUS FOR FEED AIR IN CRYOGENIC AIR SEPARATION

This application is the U.S. national phase of International Application No. PCT/JP2006/324763, filed 12 Dec. 2006, which designated the U.S. and claims priority to Japan Application No. 2005-361073, filed 14 Dec. 2005, and Japan Application No. 2006-087564, filed 28 Mar. 2006, the entire contents of each of which are hereby incorporated by reference.

TECHNICAL FIELD

The present invention relates to a purification method and a purification apparatus which are preferable to remove carbon dioxide, nitrogen oxide, or a hydrocarbon in feed air in cryogenic air separation. Also, the present invention enables a purification apparatus to be downsized and to remove a nitrogen oxide and a hydrocarbon at the same as carbon dioxide by using a carbon dioxide adsorbent.

Priority is claimed on Japanese Patent Applications No. 2005-361073, filed Dec. 14, 2005 and No. 2006-87564, filed Mar. 28, 2006, the contents of which are incorporated herein by reference.

BACKGROUND ART

In a cryogenic air separation apparatus, before a distillation at a cryogenic temperature, feed air is purified to remove impurities which may block a pipe or a heat exchanger. Examples of a substance, which may block, include water, carbon dioxide, and a nitrogen oxide (for example dinitrogen monoxide). Also, it is reported that a hydrocarbon is concentrated in liquid oxygen so that it may become a cause of explosion. Therefore, it is necessary to remove these impurities from the viewpoint of safety operation and ensuring safety of a cryogenic air separation apparatus.

The removal of these impurities is performed by using a purification apparatus with an adsorption column packed with an adsorbent and using a temperature swing adsorption method (TSA method) or a pressure swing adsorption method (PSA method). In general, a PSA method has a larger energy loss than a TSA method because the switching frequency of adsorption columns is often. Also, the yield of purified gas is not good because a large amount of regenerating gas is required in a PSA method. Therefore, a TSA method is mainly used for the purification of feed air for cryogenic air separation.

In recent years, in response to the demand for a large amount of production, a cryogenic air separation apparatus is likely to be upsized. However, further improved performance is also desired in order to hold down initial investment. For example, in a purification apparatus for feed air, an adsorbent with an increased adsorption capacity has been developed in order to reduce a used amount of the adsorbent (see patent reference 1).

When the adsorption capacity is increased, the amount of an adsorbent, which is necessary to process the same amount of gas, can be decreased. Therefore, an adsorption column can be downsized. In the purification apparatus using a TSA method, an adsorbent with a small particle diameter has been used from the viewpoint of effectively using the adsorption capacity of an adsorbent. Therefore, in order to prevent an adsorbent from being blown up and fluidized, an air velocity at the entrance of an adsorbent layer is adjusted within a certain range.

There is the relationship of "(air velocity)=(flow rate of feed air)/(cross-sectional area of adsorption column)" among an air velocity at the entrance of an adsorbent layer, a flow rate of feed air, and a cross-sectional area of an adsorption column. Therefore, a cross-sectional area of an adsorption column at a certain flow rate of feed air is determined by an air velocity regardless of other conditions. Because an air velocity is constant, a column diameter is kept constant, and the downsizing of a purification apparatus due to the decrease in an amount of an adsorbent is achieved by lowering the height of an adsorption column.

Meanwhile, when a flow rate of feed air is increased in order to increase production, an amount of an adsorbent, which is necessary for pretreatment, is increased in proportion. From the aforementioned relationship between an air velocity and a cross-sectional area of an adsorption column, the increase in a flow rate of feed air corresponds to the increase in a cross-sectional area of an adsorption column, i.e. the increase in a column diameter. As previously stated, because the effect due to the improved performance of an adsorbent is lowering the height of an adsorption column, the increase of a throughput rate makes a column diameter to be larger than the height in an adsorption column.

However, two problems occur in the adsorption column with a large column diameter. One is the problem of gas dispersion, and the other is the problem of an installation area. In general, during adsorption operation, it is necessary to consider the dispersion so as to uniformly flow gas in an adsorbent layer. However, when the diameter of an adsorbent layer is larger than the packed height, it is difficult to disperse gas uniformly. Meanwhile, when a column diameter of an adsorption column is large, an installation area is large, too. Therefore, the demand of the downsizing of an apparatus is not fulfilled.

Accordingly, a conventional design method of an adsorption column has limitations as a countermeasure for upsizing of a cryogenic air separation apparatus.

Meanwhile, examples of a technique to remove a nitrogen oxide and a hydrocarbon in feed air include a method to remove them by using an adsorbent such as zeolite.

Patent reference 2 discloses a method and an equipment to remove moisture, carbon dioxide, and dinitrogen monoxide, which use the first, second, and third adsorbent layers made of three kinds of adsorbents respectively corresponding to moisture, carbon dioxide, and dinitrogen monoxide in air purification using a TSA method.

Figure 2:
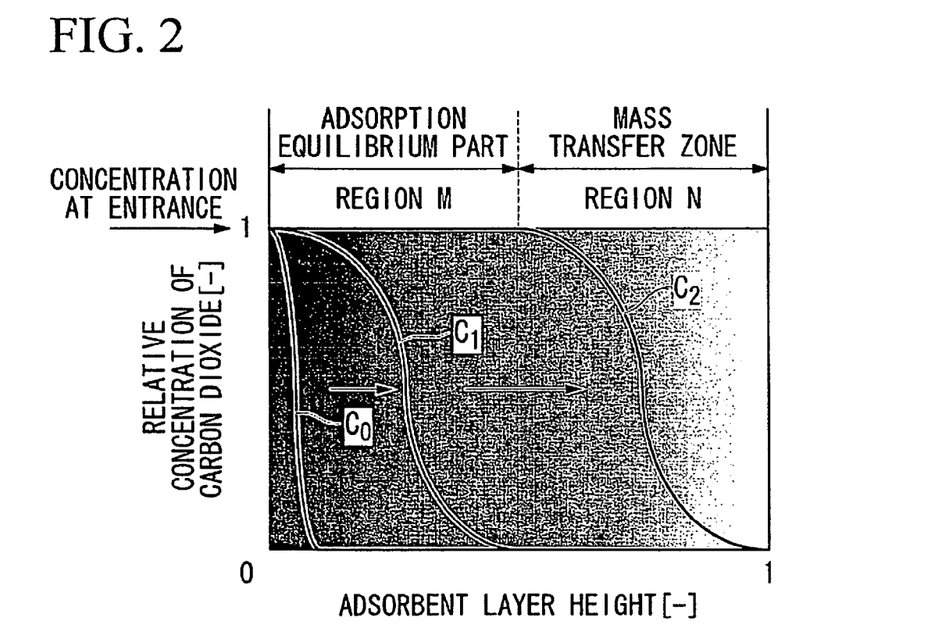
FIG. 2 is a graph schematically representing an adsorption equilibrium part and a mass transfer zone of carbon dioxide in an adsorbent layer in a conventional TSA method.

The FIG. 2 of this patent reference 2 shows that $N_2O$ breaks through much earlier than carbon dioxide in the case where air including carbon dioxide and $N_2O$ flows in a NaX zeolite adsorbent layer. The removal rate of $N_2O$ at the time point when carbon dioxide breaks through, which is calculated from the aforementioned figure, is about 30%, indicating that it is difficult to simultaneously remove carbon dioxide and $N_2O$ by using only a NaX zeolite layer in a TSA method.

NaX zeolite has the properties of adsorbing $N_2O$ and much strongly adsorbing carbon dioxide. Because $N_2O$, which is adsorbed once, is desorbed by carbon dioxide, and pushed downstream, $N_2O$ breaks through much earlier than carbon dioxide. Therefore, patent reference 2 teaches that the third adsorbent is packed in order to remove the pushed $N_2O$.

Patent reference 3 discloses that an adsorbent layer selected from among alumina and X type, Y type, and A type zeolites is used in a process to remove moisture, carbon dioxide, and a nitrogen oxide by a PSA method. However, by the reference to the matters described in patent reference 2, the removal of a nitrogen oxide by X type zeolite seems to be the effect limited in a PSA method, for example.

In the case of a TSA method, as the adsorption equilibrium of carbon dioxide reaches from the upstream of an adsorbent layer to the downstream, $N_2O$ is pushed downstream. On the other hand, in a PSA method, the adsorption distribution of carbon dioxide is broadened over an adsorbent-packed layer, and so it is speculated that the effect of pushing $N_2O$ does not appear as remarkably as a TSA method.

In general, a PSA method has a larger energy loss than a TSA method because the switching frequency of adsorption columns is often. Also, the yield is not good because a large amount of regenerating gas is required in a PSA method. Accompanying the upsizing of a cryogenic air separation apparatus, these demerits become significant, and the big difference occurs between two methods. Therefore, if $N_2O$ can be removed with the adsorption of carbon dioxide by a TSA method in the same way as a PSA method, the demerits of PSA method can be avoided.

[Patent Reference 1] Japanese Unexamined Patent Application, First Publication No. 2001-347123
[Patent Reference 2] Japanese Unexamined Patent Application, First Publication No. 2000-107546
[Patent Reference 3] European Patent Application, Publication No. 862,938

DISCLOSURE OF INVENTION

Therefore, objects of the present invention are to reduce an amount of a carbon dioxide adsorbent packed in an adsorption column in the case where carbon dioxide in feed air is removed by a TSA method, and to downsize an adsorption column so as to reduce an installation area.

Also, another object of the present invention is to efficiently remove a nitrogen oxide and a hydrocarbon as well as carbon dioxide by using a carbon dioxide adsorbent in the case of the purification of feed air for a cryogenic air separation apparatus on the basis of a TSA method.

In order to solve the aforementioned problems,
the present invention provides a purification method for feed air in cryogenic air separation of the present invention, including:
purifying the feed air for the cryogenic air separation by using a temperature swing adsorption method, wherein the whole region of a carbon dioxide adsorbent layer packed in an adsorption column is used as a mass transfer zone of a carbon dioxide.

In the present invention, a nitrogen oxide and a hydrocarbon can be removed at the same time as the carbon dioxide.

The present invention is preferable in the case where the nitrogen oxide is $N_2O$ and the hydrocarbon is $C_2H_4$.

In the present invention, a gas velocity of the feed air in the adsorption column is preferably 0.25 to 0.4 m/s.

In the present invention, an overall mass transfer coefficient of the carbon dioxide adsorbent is preferably 2 to 8 $s^{-1}$ in the case where NaX zeolite is used as the carbon dioxide adsorbent.

The present invention provides a purification apparatus of feed air in cryogenic air separation, including:
at least two adsorption columns; and
a moisture adsorbent and a carbon dioxide adsorbent being laminated and packed in the adsorption columns, wherein
the packed amount of the carbon dioxide adsorbent is the same as the amount of the carbon dioxide adsorbent in the region which a mass transfer zone of carbon dioxide occupies at the end of an adsorption step, and
a temperature swing adsorption method is used.

In the present invention, the packed amount of the carbon dioxide adsorbent is preferably 100% to 140% of the amount of the carbon dioxide adsorbent in the region which the mass transfer zone of the carbon dioxide occupies at the end of an adsorption step.

In the present invention, a column diameter of the adsorption column is preferably configured such that a gas velocity of the feed air in the adsorption column is 0.25 to 0.4 m/s.

In the present invention, a particle diameter of the carbon dioxide adsorbent is preferably 2.2 to 4.5 mm.

In the present invention, the carbon dioxide adsorbent is preferably NaX zeolite.

The present invention provides a cryogenic air separation plant equipped with the aforementioned purification apparatus.

According to the present invention, because the whole region of a packed layer of carbon dioxide adsorbent is used as a mass transfer zone of a carbon dioxide, a purification apparatus for feed air, which has a low pressure loss and a small installation area, can be produced without deteriorating the economical efficiency of a cryogenic air separation. Also, a required amount of an adsorbent can be reduced. Also, a nitrogen oxide and a hydrocarbon can be substantially removed at the same as the carbon dioxide by using a carbon dioxide adsorbent.

BEST MODE FOR CARRYING OUT THE INVENTION

For the purpose of clarifying the technical concept of the present invention, firstly, a conventional concept of a TSA method is described, and then, embodiments of the present invention are described in detail.

In a TSA method, an adsorption step and a regeneration step are alternately performed. When air is introduced into an adsorption column in the beginning of an adsorption step, adsorption of gas is started at the entrance of an adsorption layer. Because a certain time is required until an adsorbent reaches adsorption equilibrium, an adsorbent layer part, which does not reach adsorption equilibrium yet and is called a mass transfer zone, occurs in an adsorption column. A graph schematically representing this is FIG. 2.

FIG. 2 represents the change in concentration distribution of an adsorbed component proceeding in an adsorbent layer as a function of time. In this FIG. 2, the vertical axis is a relative concentration of carbon dioxide in feed air, which represents a carbon dioxide concentration in a gas phase. Also, the horizontal axis represents height of an adsorbent layer which is normalized to be dimensionless. The left end, i.e. 0 point, of the horizontal axis means the entrance of feed air, and the right end, i.e. 1, means the exit of purified air. The curves $C_0$, $C_1$, and $C_2$ respectively represent the concentration distribution of carbon dioxide of a mass transfer zone. $C_0$ represents the concentration distribution of a mass transfer zone appearing shortly after the beginning of adsorption step (time $t_0$), $C_1$ represents the concentration distribution of a mass transfer zone appearing after the elapse of a certain time from the beginning of adsorption step (time $t_1$), and $C_2$ represents the concentration distribution of a mass transfer zone appearing after the elapse of more time (time $t_2$). In the adsorption of carbon dioxide, the shape of the curve $C_1$ at the time $t_1$ is the almost same as the shape of the curve $C_2$ at the time $t_2$, and it is known that the concentration distribution of a mass transfer zone proceeds while keeping a constant pattern.

The curve $C_2$ in FIG. 2 represents the concentration distribution at the time point (time $t_2$) when the front end of a mass transfer zone reaches the exit end of an adsorbent layer. In the case where a mass transfer zone goes out of the exit end of an adsorbent layer, carbon dioxide breaks through. Therefore, the time period from the time point, when feed air starts to be provided to an adsorbent layer, to the time point, when the front end of a mass transfer zone reaches the exit end of an adsorbent layer, is determined as an adsorption step time. In FIG. 2, after the elapse of time $t_2$, an adsorbent layer region (region M), in which carbon dioxide is saturated, is an adsorption equilibrium part, and an adsorbent layer region (region N), in which the concentration distribution of carbon dioxide exists, is a mass transfer zone. The total amount of adsorbent layers in the region M and the region N is determined as the amount of an adsorbent which is required to remove carbon dioxide.

For the downsizing of an adsorption column, a method of using a small amount of an adsorbent can be considered, but a method of decreasing the region N, in which adsorption equilibrium is not reached, as much as possible is considered as a good one from the viewpoint of the effective use of an adsorbent. Therefore, in order to shorten the region N, i.e. a mass transfer zone, the approaches such as slowing down a gas velocity or using an adsorbent with a small particle diameter have been used. However, for the significant downsizing of an apparatus, a different approach from conventional ones is required.

Figure 1:
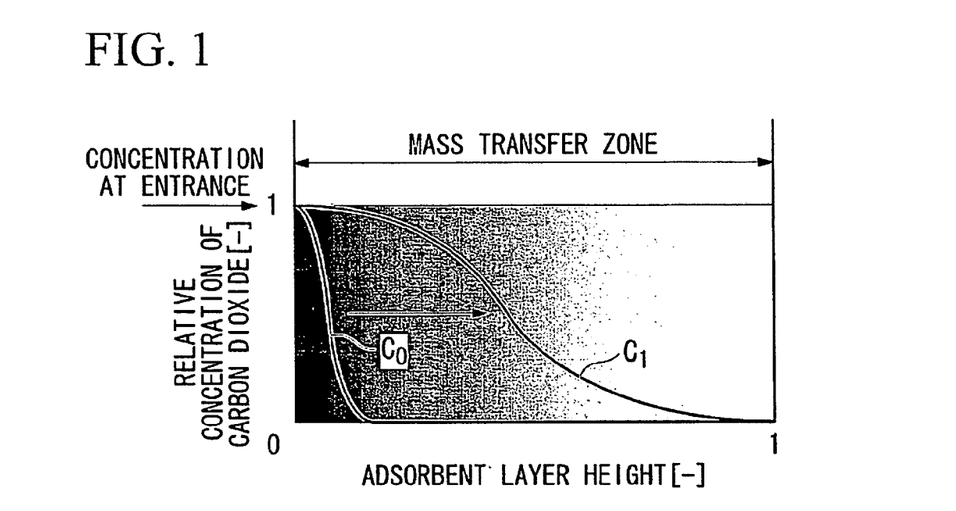
FIG. 1 is a graph schematically representing a mass transfer zone of carbon dioxide in an adsorbent layer in the present invention.

FIG. 1 schematically represents the technical concept of the present invention. In the same manner as FIG. 2, in FIG. 1, the vertical axis is a relative concentration of carbon dioxide in feed air, which represents a carbon dioxide concentration in a gas phase. Also, the horizontal axis represents height of an adsorbent layer which is normalized to be dimensionless.

When adsorption step is started, feed air is provided into an adsorbent layer from the left side of FIG. 1. In the concentration distribution $C_0$ which is formed at the entrance as a transitional state at time $T_0$, the front end is elongated as a lapse of time, and the concentration distribution $C_1$ with a constant pattern is formed after a certain time (time $T_1$). $C_1$ in FIG. 1 represents the time point when the front end of the concentration distribution reaches the exit of air, and at this time point, the adsorption step is finished.

The concept of the present invention in that a mass transfer zone of carbon dioxide is formed in the whole region of a packed adsorbent layer in a TSA method is totally different from the conventional concepts of adsorption technology. This is because the formation of this mass transfer zone is considered to be economically inefficient due to the increase in an amount of an adsorbent. In fact, only half of the adsorption capacity of an adsorbent is used in the present invention, and therefore, an adsorbent seems to be used economically inefficiently. However, according to the present invention, it was found that the total amount of an adsorbent can be reduced very much by using an adsorbent having a specific adsorption property and a relatively short adsorption cycle.

In a PSA method, the concentration distribution of impurities, which is similar to a mass transfer zone of the present invention, is formed in the whole region of an adsorbent layer. However, this concentration distribution is formed by the operation called dynamic steady state in which regeneration step is finished while leaving the concentration distribution in an adsorbent layer, followed by performing an adsorption step. In contrast, in a TSA method, the concentration distribution disappears in principle at the end of a regeneration step. Therefore, the concentration distribution in a PSA method is totally different from the concept of a mass transfer zone which is formed during every adsorption step in a TSA method of the present invention.

As showed in FIG. 1, the state, in which a mass transfer zone of carbon dioxide is formed in the whole region of an adsorbent layer at the end of an adsorption step ($T_1$), represents an ideal embodiment of the present invention. Hereinafter, the temperature of feed air is described as one of operation conditions for a feed air purifier of a cryogenic air separation apparatus such as an adsorption operation condition. Feed air is preliminarily cooled by a cooler after an air compressor, subsequently cooled to about 10° C. by a mechanical refrigerator, and then provided into an adsorption column. The aforementioned preliminary cooling is generally on the basis of water-cooling type. Because the temperature of cooling water varies by the effect of outside air, the temperature of air released from a refrigerator also varies. An adsorption capacity has temperature dependency. Therefore, by the effect of the temperature of feed air, the position of a mass transfer zone at the end of adsorption step stays relatively short or proceeds in the exit direction.

In the case where temperature and an amount of moisture are fully controlled, the amount of an adsorbent corresponding to the length of a mass transfer zone, which is preliminarily obtained by a calculation, may be packed. However, in the case where the present invention is used in feed air purification of a cryogenic air separation apparatus, the breakthrough of impurities must be absolutely avoided because the effect to a downstream cryogenic air separation apparatus is significant. Therefore, regarding an amount of an adsorbent which is actually packed in an adsorbent column, in the case where the amount corresponding to the length of a mass transfer zone which is preliminarily obtained by a calculation is determined as 100%, an adsorbent needs to be packed at around 10% to 20% more than this amount. Accordingly, in the area where difference in temperature is extreme, an adsorbent may be packed preferably at around 140% of the calculated value to avoid breakthrough during a season when outside air temperature becomes high.

In the case where the present invention is carried out, as an adsorbent to adjust the length of a mass transfer zone to packed height of a carbon dioxide adsorbent, an adsorbent, which elongates the length of a mass transfer zone much more than a conventionally used carbon dioxide adsorbent, is required. As such adsorbent, an adsorbent with a larger particle diameter than a conventional adsorbent used in purification step of cryogenic air separation is preferably selected. When an adsorbent with a larger particle diameter is used, the pressure loss due to an adsorbent layer is decreased, and therefore, discharge pressure of a feed air compressor can be lowered, resulting in saving of power.

Also, in the present invention, in order to elongate the length of a mass transfer zone, a faster air velocity (0.25 to 0.4 m/s) than conventional one is preferable. A faster air velocity than conventional one can reduce a cross-sectional area of an adsorption column. Also, by using an adsorbent with a high adsorption capacity, a used amount of an adsorbent can be further reduced.

Regarding the case where a mass transfer zone with a constant pattern is formed, in "Introduction to Measurement and Analysis of Adsorption", Y. Takeuchi, the Society of Separation Step Engineers, Japan, published in 2003, Takeuchi stated that the length of a mass transfer zone $Z_a$ is related to a gas velocity u, and represented by the following equation (1).

$$Z_a = N_{OF}(u/K_F a_V) \quad (1)$$

Herein, $N_{OF}$ represents a mass transfer unit number, which is a value obtained by adsorption isotherm which is represented by $N_{OF} = \int [1/(c-c^*)]dc$. Also, u represents a gas velocity at the entrance of an adsorption layer, and $K_F a_V$ represents an overall mass transfer coefficient.

Also, the length of a mass transfer zone $Z_a$ can be obtained by using the measurement results of breakthrough curve and the following equation (2).

$$Z_a = Z[(t_e - t_b)/(t_e - 0.5(t_e - t_b))] \quad (2)$$

Z: packed height of adsorbent $t_e$: saturated time $t_b$: breakthrough time

As can be seen in the equation (1), in order to adjust the height of a packed layer of a carbon dioxide adsorbent to the length of a mass transfer zone of carbon dioxide, it is necessary to use an adsorbent with an overall mass transfer coefficient within a specified range.

In a conventional method, it has been believed that the use of an adsorbent with an overall mass transfer coefficient as large as possible is important to design an adsorption column with high economical efficiency. On the other hand, in the present invention, it is desired to use a carbon dioxide adsorbent with an overall mass transfer coefficient within a specified range.

In the working of the present invention, a carbon dioxide adsorbent can be used regardless of a type thereof as long as it can adsorb carbon dioxide well. Among adsorbents, NaX type zeolite is preferable for the working of the present invention. NaX type zeolite is a generic term including a binder-including type, a binderless type in which a binder becomes zeolite, and a so called LSX (low silica X) type zeolite in which the ratio of silica and alumina is small. In the case where these NaX zeolites are used, it is preferable that the overall mass transfer coefficient thereof be 2 to 8 s$^{-1}$.

Table 1 shows $N_{OF}$ of 7 kinds of NaX type zeolites obtained from adsorbent manufacturers, which are different in a particle diameter and a shape. In Table 1, for example, the adsorbents 4 to 6 have the same shape and particle diameter, but are different in manufacturers.

In general, the performance of an adsorbent depends on a production method. For example, even though conditions for synthesis of zeolite are the same, when there are differences in a content of binder, a calcining temperature for activation, a method of making binderless type, and so on, the performance such as adsorption capacity varies. A production method of an adsorbent varies depending on each of manufacturers, and therefore, it is important to obtain adsorbents from a plurality of manufacturers and to select one corresponding to an aim.

$N_{OF}$ of each adsorbent is a value obtained by adsorption isotherm. By using $N_{OF}$ and $Z_a$ obtained by a breakthrough experiment, $K_F a_V$ for the working of the present invention can be obtained.

The values of $N_{OF}$ of each adsorbent shown in Table 1 were obtained by measuring adsorption isotherm of carbon dioxide at 10° C. on the basis of a volumetric method.

TABLE 1

| | Adsorbents (particle diameter, shape) | $N_{OF}$ |
|---|---|---|
| 1 | Binderless NaX (1.5 mm, pellet) | 12.4 |
| 2 | Binderless NaX (3.5 mm, pellet) | 12.3 |
| 3 | Binderless NaX (1.5 mm, pellet) | 12.0 |
| 4 | LSX (4.5 mm, pellet) | 8.1 |
| 5 | LSX (4.5 mm, pellet) | 9.1 |
| 6 | LSX (4.5 mm, pellet) | 8.2 |
| 7 | Binder-including NaX (3.5 mm, pellet) | 14.8 |
| 8 | LSX (3.5 mm, beads) | 8.0 |
| 9 | LSX (3.5 mm, beads) | 8.2 |
| 10 | LSX (1.6 mm, beads) | 8.1 |

In the working of the present invention, an adsorbent to adjust the whole region of an adsorbent layer to a mass transfer zone is required. On the basis of $Z_a$ obtained by a breakthrough experiment, an adsorbent suitable for the present invention can be selected. Also, $K_F a_V$ of each adsorbent can be obtained by using $N_{OF}$ shown in Table 1 and the aforementioned $Z_a$.

Also, as can be seen in equation (1), a mass transfer zone can be broadened when u (a gas velocity at the entrance of an adsorption layer) is increased. However, in order to prevent the fluidization of adsorbent particles due to increased gas velocity, an adsorbent with a particle diameter of 2.2 to 4.5 mm is preferably used in the present invention.

Also, the present inventors found that it is possible to efficiently remove a nitrogen oxide and a hydrocarbon as well as carbon dioxide by using a carbon dioxide adsorbent when the whole region of an adsorbent layer is adjusted to a mass transfer zone.

In a conventional method, an adsorption equilibrium part of carbon dioxide is large, and therefore, the desorption of $N_2O$ are caused by carbon dioxide, which lowers the removal ratio of a nitrogen oxide.

The present inventors found the following. Even when NaX type zeolite, which has ever been believed to be unsuitable for the simultaneous removal of carbon dioxide and $N_2O$, is used, by forming a mass transfer zone of a carbon dioxide adsorbent in the whole region of an adsorbent, the desorption of $N_2O$ due to carbon dioxide can be prevented, and $N_2O$ can be removed substantially. Herein, the term of "substantially" means a removal rate of 70% or more.

In a very small amount of hydrocarbon included in air, there are a saturated hydrocarbon such as $CH_4$, $C_2H_6$, or $C_3H_8$ and an unsaturated hydrocarbon such as $C_2H_2$, $C_2H_4$, or $C_3H_6$. A saturated hydrocarbon cannot be removed by usual zeolite used for adsorption of carbon dioxide, but an unsaturated hydrocarbon is adsorbed by NaX type zeolite well. Although the desorption of $C_2H_4$ are caused in the same way as the aforementioned $N_2O$, by forming a mass transfer zone of a carbon dioxide adsorbent in the whole region of an adsorbent, $C_2H_4$ can be removed substantially in the same way as $N_2O$.

A purification apparatus of the present invention includes at least two adsorption columns, and is operated by exchanging an adsorption step and a regeneration step in these adsorption columns on the basis of a TSA method. A regeneration step includes 4 steps of a depressurizing step, a heating step, a cooling step, and a repressurizing step. In an adsorption column, moisture adsorbents are packed at an air inlet side, and carbon dioxide adsorbents are packed at a latter part thereof. Impurities in air are continuously removed by alternately exchanging a relatively low-temperature adsorption step and a relatively high-temperature regeneration step.

As a moisture adsorbent, activated alumina, silica gel, KA type zeolite, NaA type zeolite, or NaX type zeolite is used.

As long as water can be substantially removed by a moisture adsorbent, a regenerating temperature of a carbon dioxide adsorbent may be 100° C. to 150° C., and is preferably 150° C. to 250° C. in the case where moisture is introduced into a carbon dioxide adsorbent (zeolite) layer.

EXAMPLES

Example 1

Hereinafter, the examples of the present invention using LSX type zeolite as a carbon dioxide adsorbent are described.

Figure 3:
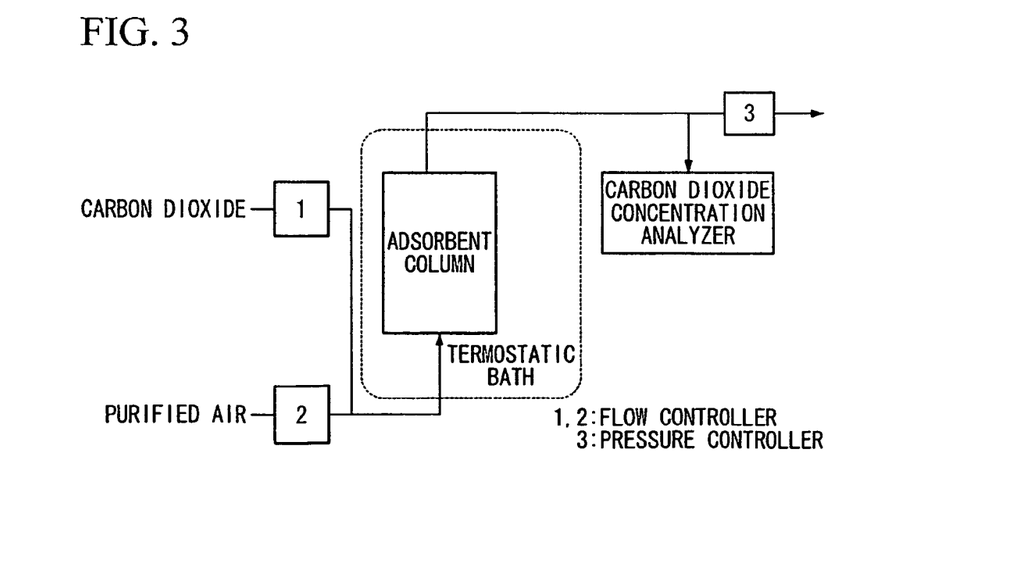
FIG. 3 is a schematic diagram of a measuring apparatus for obtaining a breakthrough curve.
Figure 4:
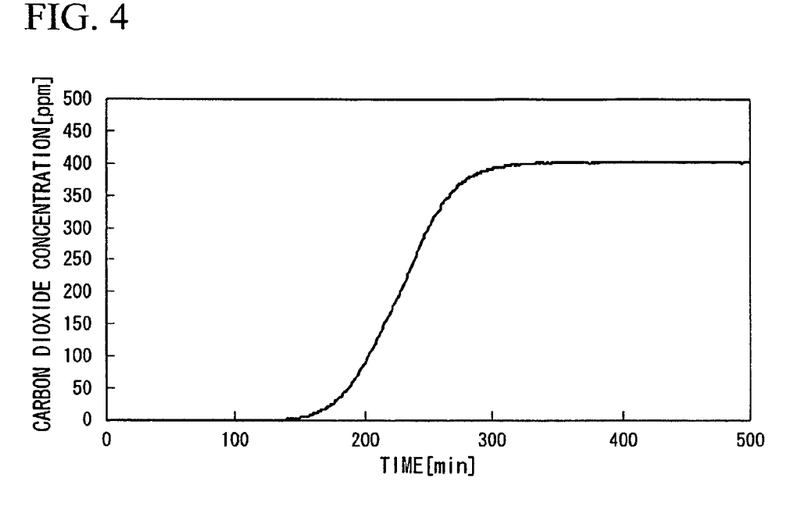
FIG. 4 is a graph of a breakthrough curve of carbon dioxide.

The adsorbent No. 8 shown in Table 1 (LSX type zeolite with a diameter of 3.5 mm and a shape of beads) was used, and the breakthrough curve and the adsorption isotherm were obtained by the experiments. The breakthrough curve was obtained by using the measuring apparatus represented by FIG. 3. This measuring apparatus included the adsorption column with an internal diameter of 100 mm in which LSX type zeolite was packed at a height of 2.0 m. By using this apparatus, dried air containing carbon dioxide of 400 ppm was flowed at a pressure of 550 kPa (absolute pressure), an adsorption temperature of 10° C., and a velocity of 0.3 m/s, to thereby obtain the breakthrough curve represented by FIG. 4. The equilibrium-adsorbed amount q and the length of a mass transfer zone $Z_a$ were calculated from the breakthrough curve of FIG. 4, and then, the following results were obtained: q=1.6 mol/kg and $Z_a$=1.14 m.

Also, regarding the aforementioned adsorbent, an equilibrium-adsorbed amount of carbon dioxide was separately measured by using the apparatus for a volumetric method. $N_{OF}$ was calculated from the obtained adsorption isotherm, and the overall mass transfer coefficient $K_Fa_V$ was calculated from the $N_{OF}$'s value (8.0) and the length of a mass transfer zone. Then, the following result was obtained: $K_Fa_V$=2.1 $s^{-1}$.

In consideration of the aforementioned conditions, moisture adsorbents were packed in the adsorption column with an internal diameter of 0.3 m, and LSX type zeolite was packed at the latter part thereof at a height of 1.2 m so that the height became the almost same as previously obtained $Z_3$. By using the pilot scale adsorption column, the adsorption experiment of carbon dioxide was performed. The packed volume of LSX type zeolite was $8.5 \times 10^{-2}$ $m^3$, the packed amount was 56 Kg, and the packed density was about 660 Kg/$m^3$. The experiment was performed by using the air containing carbon dioxide of 400 ppm. The gas flow rate was adjusted to 400 $Nm^3$/h (compensated at atmospheric pressure and 0° C.) so that the velocity in the adsorption column became the same as the velocity (0.3 m/s) used when the breakthrough curve was calculated. The adsorption experiment on the basis of a TSA method was performed at a pressure during adsorption of 550 kPa (absolute pressure), an adsorption temperature of 10° C., and a regeneration temperature of 150° C. Adsorption and regeneration were repeated at a cycle time of 2 hours, and the purified gas from the adsorption column was measured when the steady state appeared. Then, carbon dioxide did not be detected.

Example 2

Example 2 shows the case where the adsorbent No. 9 shown in Table 1 (LSX type zeolite with a diameter of 3.5 mm and a shape of beads), which has different performance from that in Example 1, was used. By using the measuring apparatus represented by FIG. 3 and the adsorbent No. 9, the dried air containing carbon dioxide of 400 ppm was flowed at a pressure of 550 kPa (absolute pressure), an adsorption temperature of 10° C., and a velocity of 0.3 m/s, to thereby obtain the breakthrough curve. The equilibrium-adsorbed amount q and the length of a mass transfer zone $Z_a$ were calculated from the breakthrough curve, and then, the following results were obtained: q=1.6 mol/kg and $Z_a$=0.39 m.

Also, regarding the aforementioned adsorbent, the overall mass transfer coefficient $K_Fa_V$ was calculated. Then, $N_{OF}$ was 8.2, and the following result was obtained: $K_Fa_V$=6.3 $s^{-1}$.

In consideration of the aforementioned conditions, moisture adsorbents were packed in the adsorption column with an internal diameter of 0.3 m, and the adsorbent No. 9 was packed at the latter part thereof at a height of 0.4 m so that the height became the almost same as previously obtained $Z_3$. By using the pilot plant with the adsorption column, the adsorption experiment of carbon dioxide was performed. The packed volume of LSX type zeolite was $2.8 \times 10^{-2}$ $m^3$, the packed amount was 18.5 Kg, and the packed density was about 660 Kg/$m^3$. The experiment was performed by using the air containing carbon dioxide of 400 ppm. The gas flow rate was adjusted to 400 $Nm^3$/h (compensated at atmospheric pressure and 0° C.) so that the velocity in the adsorption column became 0.3 m/s. The adsorption experiment on the basis of a TSA method was performed at a pressure during adsorption of 550 kPa (absolute pressure), an adsorption temperature of 10° C., and a regeneration temperature of 150° C. Adsorption and regeneration were repeated at a cycle time of 2 hours, and the purified gas from the adsorption column was measured when the steady state appeared. Then, carbon dioxide did not be detected.

Comparative Example 1

By using LSX type zeolite and the conventional approach of shortening a mass transfer zone, a necessary size of an adsorption column was calculated. One of methods of shortening a mass transfer zone is to use conditions under which an overall mass transfer coefficient is increased. An overall mass transfer coefficient is affected by an equilibrium-adsorbed amount of an adsorbent, an adsorption rate, a particle diameter, and a gas velocity. In the case of the same type of an adsorbent, in order to increase an overall mass transfer coefficient, an adsorbent with a small particle diameter is used, or a gas velocity is slowed down.

In the same way as Example 1, the breakthrough curve was obtained by using the adsorbent No. 10 shown in Table 1 (LSX type zeolite with a diameter of 1.6 mm and a shape of beads), which has a small particle diameter and different performance from those in Examples. In this case, the velocity was adjusted to 0.1 m/s. The equilibrium-adsorbed amount q was 1.6 mol/kg, which was almost the same as that in Example 1, and the length of a mass transfer zone $Z_a$ was 0.10 m.

Also, regarding the aforementioned adsorbent, the overall mass transfer coefficient $K_F a_V$ was calculated. Then, $N_{OF}$ was 8.1, and the following result was obtained: $K_F a_V$=8.1 s$^{-1}$.

Because the packed density of LSX type zeolite with a particle diameter of 1.6 mm is 684 kg/m$^3$, carbon dioxide adsorbents of 3.7×10$^{-2}$ m$^3$ and 25.1 kg are required in order to process the dried air of 400 m$^3$/h (compensated at atmospheric pressure and 0° C.) containing carbon dioxide of 400 ppm at a cycle time of 4 hours. Therefore, when a velocity is 0.1 μm/s, a packed height of carbon dioxide adsorbents is about 0.17 m, and a packed diameter is 0.52 m. The packed height of carbon dioxide adsorbents in Comparative Example 1 is 170% of the length of a mass transfer zone. A necessary packed amount of carbon dioxide adsorbents, which is required to process the same flow rate of gas in Example 1 of the present invention, is smaller than that in Example 1. However, because a column diameter is increased by 70%, an installed area becomes 3 times as large as that in Example 1.

Also, the packed height of adsorbents of 0.17 m is not realistic for a practical apparatus in which a column diameter has to be increased depending on throughput. This is because it is difficult to pack adsorbents at a uniformly packed height of 0.17 m in an adsorption column with a large column diameter.

When a packed height is adjusted to 0.4 m or more, for example, so as to achieve an uniform height even in a large column diameter, a packed amount of carbon dioxide adsorbents is required at 58.1 kg or more.

Example 3

Figure 5:
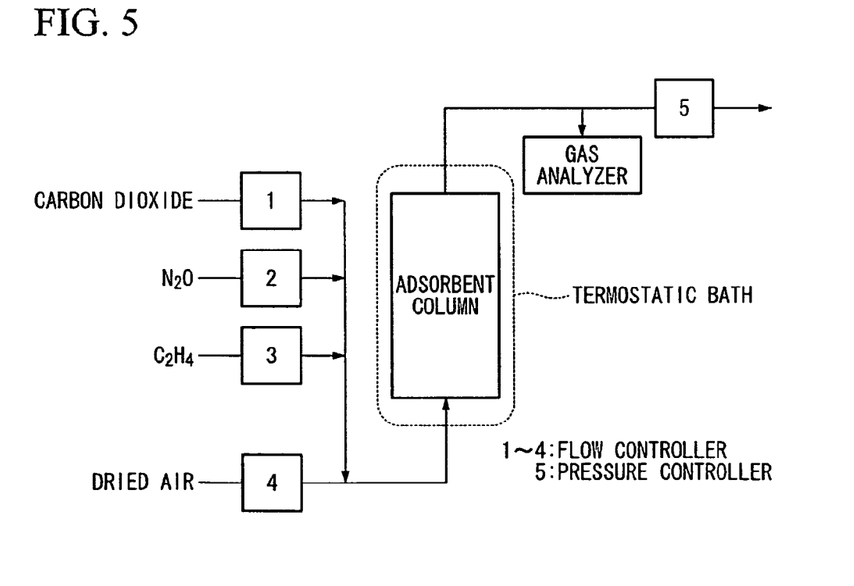
FIG. 5 is a schematic diagram of a measuring apparatus for obtaining a breakthrough curve.
Figure 6:
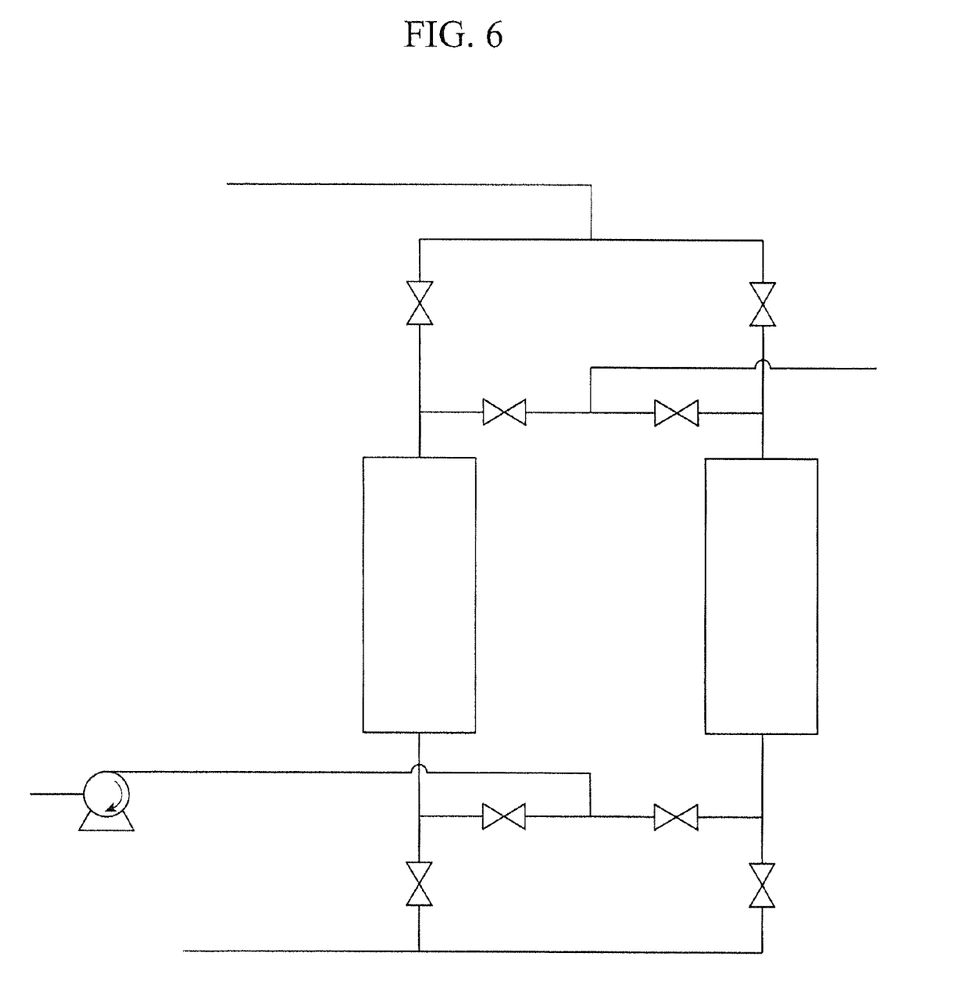
FIG. 6 is a schematic diagram of a purification apparatus having at least two adsorption columns as recited in claim 6

In the adsorption column (an internal diameter of 0.1 m) of the experimental apparatus represented by FIG. 5, the adsorbent No. 2 shown in Table 1 was packed so that the height of the adsorbent layer became 0.3 m. Into this adsorption column, the dried air containing carbon dioxide of 400 ppm was flowed at a pressure of 550 kPa (absolute pressure), an adsorption temperature of 10° C., and a velocity of 0.16 m/s, to thereby perform the breakthrough experiment. After 161 minutes from the start of addition of carbon dioxide, carbon dioxide broke through. The length of a mass transfer zone $Z_a$ of carbon dioxide was calculated from the measurement results of the breakthrough curve. Then, $Z_a$ was 0.26 m, and $K_F a_V$ was 8 s$^{-1}$.

In two of the adsorption columns with an internal diameter of 0.1 m, the aforementioned adsorbent No. 2 was packed, and the impurity removal experiment on the basis of a temperature swing adsorption method was performed. Because the mass transfer zone of the adsorbent No. 2 under the conditions of the aforementioned breakthrough experiment was 0.26 m, the adsorbent No. 2 was packed in the each column at a height of 0.3 m.

The dried air containing carbon dioxide of 400 ppm, N$_2$O of 0.3 ppm, and C$_2$H$_4$ of 1 ppm was used as feed air. Each of the contents of carbon dioxide, N$_2$O, and C$_2$H$_4$ in the feed air is an average concentration in atmosphere of the area where the cryogenic air separation apparatus was installed.

By using the aforementioned feed air, the adsorption experiment on the basis of a TSA method was performed at a velocity of 0.16 m/s, a pressure of 550 kPa (absolute pressure), an adsorption temperature of 10° C., and an adsorption column-switching time of 160 min. Then, carbon dioxide did not break through, and N$_2$O was able to be removed at 74%. Also, C$_2$H$_4$ was able to be removed at 78%.

For comparison, the experiment was performed on the basis of the conventional approach of shortening the length of a mass transfer zone as much as possible, and the results thereof were compared with the removal rate of N$_2$O and C$_2$H$_4$ in the case where the present invention was performed.

Comparative Example 2

The comparison experiment was performed by using the adsorbent with a small particle diameter, in which $K_F a_V$ becomes large, so as to shorten a mass transfer zone as much as possible. The adsorbent No. 1 shown in Table 1 was used, which is binderless NaX and has a particle diameter of 1.5 mm.

In the adsorption column (an internal diameter of 0.1 m) of the experimental apparatus represented by FIG. 5, the adsorbent No. 1 was packed so that the height of an adsorbent layer became 0.3 m. Into this adsorption column, the dried air containing carbon dioxide of 400 ppm was flowed at a pressure of 550 kPa (absolute pressure) and an adsorption temperature of 10° C., to thereby measure the breakthrough curve. In this case, a gas velocity was adjusted to 0.16 m/s on the basis of the conventional approach of shortening the length of a mass transfer zone as much as possible.

After 245 minutes from the start of addition of carbon dioxide, carbon dioxide broke through. $Z_a$ of carbon dioxide was 0.09 m, and $K_F a_V$ was 22 s$^{-1}$.

In two of the adsorption columns with an internal diameter of 0.1 m, the adsorbent No. 1 was packed until the height of the adsorption layer became 0.3 m so that the packed amount of the adsorbent became the same as that in Example 3. Then, the impurity removal experiment on the basis of a TSA method was performed. The dried air containing carbon dioxide of 400 ppm and N$_2$O of 0.3 ppm was used as feed air, and the experiment was performed at a velocity of 0.16 m/s, an adsorption pressure of 550 kPa (absolute pressure), and an adsorption temperature of 10° C.

Because the breakthrough time of carbon dioxide obtained in the breakthrough experiment was 245 minutes, the experiment was performed at an adsorption column-switching time of 240 min. Then, the removal rate of N$_2$O was 29% even though the adsorbent was used at the same amount as in Example 3.

Comparative Example 3

In Comparative Example 2, the dried air containing carbon dioxide of 400 ppm and C$_2$H$_4$ of 1 ppm was used instead, and the impurity removal experiment was performed. Then, the removal rate of C$_2$H$_4$ was 40%.

Comparative Example 4

The impurity removal experiment was performed by using twice of the amount of the adsorbent in Comparative Example 2.

In two of the adsorption columns (an internal diameter of 0.1 m), the adsorbent No. 1 shown in Table 1 was packed so that the height of the adsorption layer became 0.6 m. The dried air containing carbon dioxide of 400 ppm, N$_2$O of 0.3 ppm, and C$_2$H$_4$ of 1 ppm was used as feed air, and the experiment was performed at a velocity of 0.16 m/s, a pressure of 550 kPa (absolute pressure), and an adsorption temperature of 10° C.

The experiment was performed at an adsorption column-switching time of 240 min. Then, the removal rate of $N_2O$ was 78%, and the removal rate of $C_2H_4$ was 77%. It was found that the conventional approach required twice as many adsorbents as in the present invention in order to remove $N_2O$ and $C_2H_4$ at the same removal rates as in Example 3.

Example 4

In the adsorption column (an internal diameter of 0.063 m), the adsorbent No. 4 shown in Table 1 was packed so that the height of the adsorbent layer became 1.5 m. Into this adsorption column, the dried air containing carbon dioxide of 400 ppm was flowed at a velocity of 0.4 m/s, a pressure of 550 kPa (absolute pressure), and an adsorption temperature of 10° C., to thereby perform the breakthrough experiment. After 128 minutes from the start of addition of carbon dioxide, carbon dioxide broke through. $Z_a$ was 1.48 m, and $K_Fa_V$ was 2 $s^{-1}$.

In two of the adsorption columns with an internal diameter of 0.063 m, the adsorbent No. 4 was packed so that the height of the adsorbent layer became 1.5 m, and the impurity removal experiment on the basis of a temperature swing adsorption method was performed. The dried air containing carbon dioxide of 400 ppm, $N_2O$ of 0.3 ppm, and $C_2H_4$ of 1 ppm was used as feed air at a velocity of 0.4 m/s, a pressure of 550 kPa (absolute pressure), and an adsorption temperature of 10° C.

The experiment was performed at an adsorption column-switching time of 120 min. Then, carbon dioxide did not break through, and $N_2O$ was able to be removed at 72%. Also, $C_2H_4$ was able to be removed at 75%.

Example 5

In the adsorption column (an internal diameter of 0.1 m), the adsorbent No. 7 shown in Table 1 was packed so that the height of the adsorbent layer became 0.4 m. Into this adsorption column, the dried air containing carbon dioxide of 400 ppm was flowed at a velocity of 0.16 m/s, a pressure of 550 kPa (absolute pressure), and an adsorption temperature of 10° C., to thereby perform the pass experiment. After 139 minutes from the start of addition of carbon dioxide, carbon dioxide broke through. $Z_a$ was 0.37 m, and $K_Fa_V$ was 6 $s^{-1}$.

In two of the adsorption columns with an internal diameter of 0.1 m, the adsorbent No. 7 was packed so that the height of the adsorbent layer was 0.4 m (133% of a mass transfer zone was packed), and the impurity removal experiment on the basis of a temperature swing adsorption method was performed. Dried air containing carbon dioxide of 400 ppm, $N_2O$ of 0.3 ppm, and $C_2H_4$ of 1 ppm was used as feed air at a velocity of 0.16 m/s, a pressure of 550 kPa (absolute pressure), and an adsorption temperature of 10° C.

The experiment was performed at an adsorption column-switching time of 120 min. Then, carbon dioxide did not break through, and $N_2O$ was able to be removed at 70%. Also, $C_2H_4$ was able to be removed at 72%.

Comparative Example 5

In the adsorption column (an internal diameter of 0.1 m), the adsorbent No. 3 shown in Table 1 was packed so that the height of the adsorbent layer became 0.3 m. Into this adsorption column, the dried air containing carbon dioxide of 400 ppm was flowed at a pressure of 550 kPa (absolute pressure), an adsorption temperature of 10° C., and a velocity of 0.16 m/s, to thereby perform the breakthrough experiment. After 192 minutes from the start of addition of carbon dioxide, carbon dioxide broke through. $Z_a$ was 0.19 m, and $K_Fa_V$ was 10 $s^{-1}$.

In the case where the present invention is performed by using the adsorbent No. 3 under the conditions of the temperature, pressure, and velocity of Comparative Example, the adsorption layer with a height of about 0.2 m is enough. However, in a practical apparatus, the adsorption layer with a height of at least 0.3 m is required in order to pack an adsorbent at a uniform height. In consideration of this knowledge, in the adsorption column with an internal diameter of 0.1 m, the adsorbent No. 3 was packed so that the height of the adsorbent layer became 0.3 m, and the impurity removal experiment on the basis of a temperature swing adsorption method was performed. In this case, the dried air containing carbon dioxide of 400 ppm and $N_2O$ of 0.3 ppm was used as feed air at a velocity of 0.4 m/s, an adsorption pressure of 550 kPa (absolute pressure), and an adsorption temperature of 10° C.

The experiment was performed at an adsorption column-switching time of 190 min. Then, carbon dioxide did not break through; however, the removal rate of $N_2O$ was 50% in the adsorbent No. 3 even though 1.5 times as many adsorbents as in the present invention was packed.

Comparative Example 6

In the adsorption column (an internal diameter of 0.063 m), the adsorbent No. 6 shown in Table 1 was packed. Into this adsorption column, the dried air containing carbon dioxide of 400 ppm was flowed at a pressure of 550 kPa (absolute pressure), an adsorption temperature of 10° C., and a velocity of 0.4 m/s, to thereby perform the breakthrough experiment. After 130 minutes from the start of addition of carbon dioxide, carbon dioxide broke through. $Z_a$ was 2.2 m, and $K_Fa_V$ was 1 $s^{-1}$.

In order to use the whole region of a carbon dioxide adsorbent layer as a mass transfer zone by using the adsorbent No. 6, about 1.5 times of the packed volume in the Example 1 is required, and it is not economically efficient. This is because $K_Fa_V$ of the adsorbent No. 6 is too small.

By using the adsorbents No. 2, No. 4, No. 5, and No. 7 shown in Table 1, the present invention was performed. Then, in each case, $N_2O$ and $C_2H_4$ were able to be removed at 70% or more. In each case, $K_Fa_V$ was 2 to 8 $s^{-1}$.

INDUSTRIAL APPLICABILITY

According to the present invention, an adsorption column for purification, which has a low pressure loss and a small installation area, can be produced without deteriorating the economical efficiency of cryogenic air separation. Also, a required amount of an adsorbent can be reduced. Also, a nitrogen oxide and a hydrocarbon can be removed at the same as the carbon dioxide by using a carbon dioxide adsorbent. Accordingly, the present invention is industrially useful.

The invention claimed is:
1. A purification method for feed air in cryogenic air separation, comprising:
purifying the feed air for the cryogenic air separation by using a temperature swing adsorption method, wherein a mass transfer zone of carbon dioxide is formed in a whole region of a carbon dioxide adsorbent layer packed in an adsorption column at the end of an adsorption step, and a packed height of the carbon dioxide adsorbent layer is set to at least a length of the mass transfer zone of the carbon dioxide represented by the following equation (1):

$$Z_a = N_{OF}(u/K_F a_V) \qquad (1)$$

wherein $Z_a$ represents the length of the mass transfer zone, $N_{OF}$ represents a mass transfer unit number, u represents a gas velocity at the entrance of an adsorption layer, and $K_F a_V$ represents an overall mass transfer coefficient, and wherein the carbon dioxide adsorbent layer does not include an adsorption equilibrium part in which carbon dioxide is saturated during the adsorption step of the carbon dioxide.

2. The purification method for feed air in cryogenic air separation according to claim 1, wherein a nitrogen oxide and a hydrocarbon are removed at the same time as the carbon dioxide.

3. The purification method for feed air in cryogenic air separation according to claim 2, wherein the nitrogen oxide is $N_2O$, and the hydrocarbon is $C_2H_4$.

4. The purification method for feed air in cryogenic air separation according to claim 1, wherein a gas velocity of the feed air in the adsorption column is 0.25 to 0.4 m/s.

5. The purification method for feed air in cryogenic air separation according to claim 1, wherein an overall mass transfer coefficient of the carbon dioxide adsorbent is 2 to 8 $s^{-1}$ in the case where NaX zeolite is used as the carbon dioxide adsorbent.

6. A purification apparatus for feed air in cryogenic air separation, comprising:
   at least two adsorption columns; and
   a moisture adsorbent and a carbon dioxide adsorbent being laminated and packed in the adsorption columns, wherein a packed height of the carbon dioxide adsorbent is set to at least a length of a mass transfer zone of carbon dioxide represented by the following equation (1):

$$Z_a = N_{OF}(u/K_F a_V) \qquad (1)$$

wherein $Z_a$ represents the length of the mass transfer zone, $N_{OF}$ represents a mass transfer unit number, u represents a gas velocity at the entrance of an adsorption layer, and $K_F a_V$ represents an overall mass transfer coefficient, and a temperature swing adsorption method is used, and wherein the packed height of the carbon dioxide adsorbent does not include an adsorption equilibrium part in which carbon dioxide is saturated during the adsorption step of the carbon dioxide.

7. The purification apparatus for feed air in cryogenic air separation according to claim 6, wherein the carbon dioxide adsorbent is further laminated and packed in the adsorption columns so that the packed height of the carbon dioxide adsorbent is 0% to 40% more than the length of the mass transfer zone of carbon dioxide represented by the equation (1).

8. The purification apparatus for feed air in cryogenic air separation according to claim 6, wherein a column diameter of the adsorption column is configured such that a gas velocity of the feed air in the adsorption column is 0.25 to 0.4 m/s.

9. The purification apparatus for feed air in cryogenic air separation according to claim 6, wherein a particle diameter of the carbon dioxide adsorbent is 2.2 to 4.5 mm.

10. The purification apparatus for feed air in cryogenic air separation according to claim 6, wherein the carbon dioxide adsorbent is NaX zeolite.

11. The cryogenic air separation plant equipped with a purification apparatus for feed air in a cryogenic air separation according to claim 6.

* * * * *